Aug. 31, 1965   J. S. ROBBINS   3,203,082
ALIGNED ASSEMBLY METHOD
Original Filed June 15, 1959

INVENTOR.
James S. Robbins, deceased
By William W. Miller, Executor.
BY

ATTORNEYS

United States Patent Office 3,203,082
Patented Aug. 31, 1965

3,203,082
ALIGNED ASSEMBLY METHOD
James S. Robbins, deceased, late of Seattle, Wash., by William W. Miller, executor, Northfield, Ill., assignor to Goodman Manufacturing Company, a corporation of Illinois
Original application June 15, 1959, Ser. No. 820,200, now Patent No. 3,061,288, dated Oct. 30, 1962. Divided and this application Mar. 26, 1962, Ser. No. 183,691
3 Claims. (Cl. 29—469)

This application is a division of application Serial No. 820,200, filed June 15, 1959, now Patent No. 3,061,288, by William W. Miller, as executor of the estate of James S. Robbins, deceased, and entitled "Rotary Head Tunneling Machine."

This invention relates to improvements in boring heads for tunneling machines of the rotary boring type and more particularly relates to an improved method and apparatus accommodating ready disassembly and accurate assembly of heavy machine parts, such as, the parts of rotary boring heads.

A principal object of the invention is to provide a simplified form of connecting and locating means for the parts of heavy machinery which are frequently disassembled, accommodating the parts to be readily disassembled and assembled in accurate registry with each other during each assembly operation thereof.

A further object of the invention is to provide a series of mating concave and convex collars between two mating parts of a machine, to accurately locate the parts each time the machine is assembled and to thereby assure uniform registry of the parts throughout the life of the machine regardless of the number of times the machine is torn down and assembled.

Another object of the invention is to provide a simplified method of attaching two large heavy parts together having facing surfaces by providing mating convex and concave shear collars in these surfaces assuring accurate registry of the parts during each assembly operation thereof.

A still further object of the invention is to simplify the connection and registry of the parts of heavy machinery, such as the parts of a boring head of a rotary tunneling machine by providing registrable shear collars associated with each part, one set of shear collars being secured to one part and the other set of shear collars being loosely related to the other part and drawn into aligned relation with respect to the one set of shear collars during assembly of the machine while loose and then welded to the respective part as the parts are in aligned relation.

Figure 1:
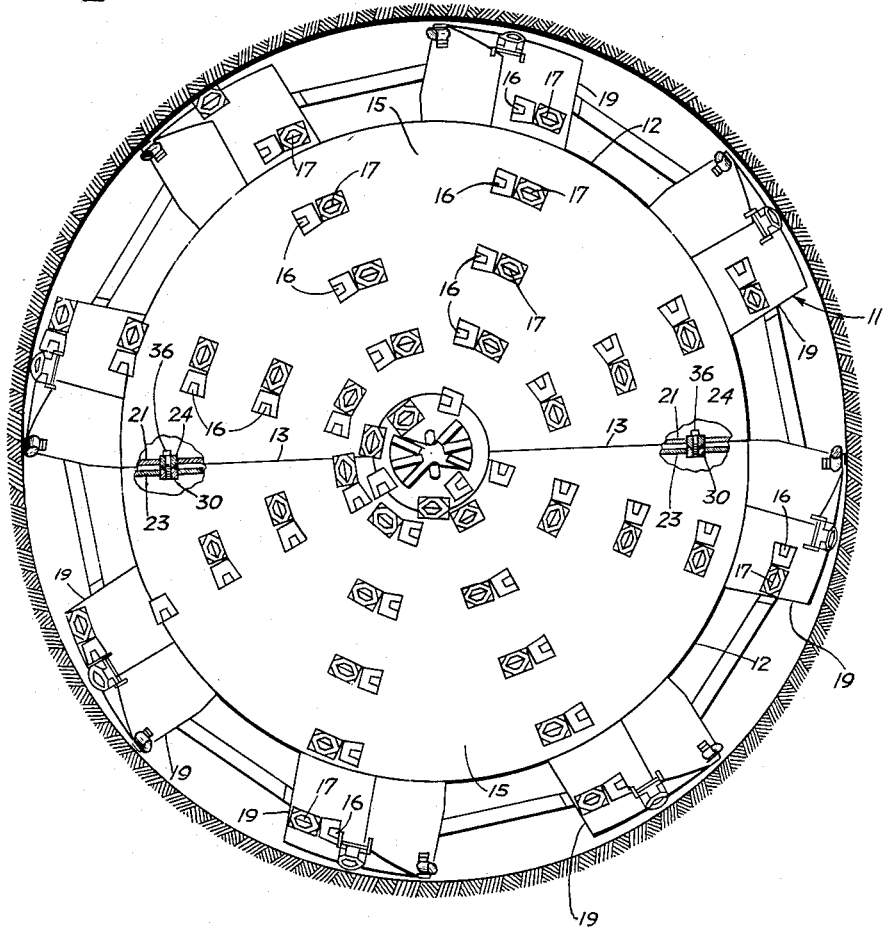
Figure 2:
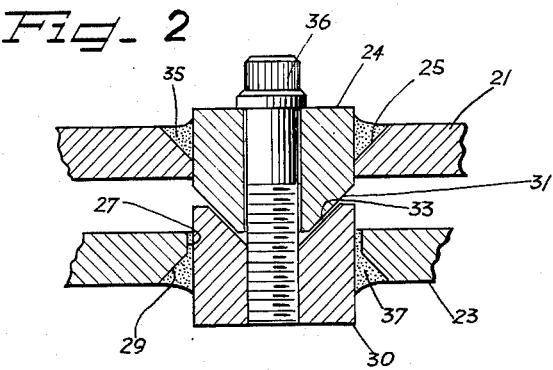

These and other objects of the invention will appear from time to time as the following specification proceeds and with reference to the accompanying drawing wherein:

FIGURE 1 is a front end view of a rotary boring head constructed in accordance with the principles of the invention, with certain parts thereof broken away and certain other parts shown in section; and FIGURE 2 is an enlarged fragmentary sectional view illustrating the apparatus and method for accurately aligning and connecting the parts of the boring head in aligned relation with respect to each other.

In the embodiment of the invention illustrated in FIGURE 1 of the drawings, a rotary boring head 11 of a tunneling machine is shown in the operation of driving a tunnel in rock and the like. The rotary boring head 11 may be thirty feet in diameter and is rotatably mounted at the front end of an elongated main frame, commonly called a jumbo (not shown) and is rotatably driven by power to drive a tunnel by rotation of said boring head and advancing movement thereof along the tunnel, as in the aforementioned parent application Serial No. 820,200, and no part of the present invention so not herein shown and described further.

The rotary boring head 11, as shown in FIGURE 1 of the drawing is in the form of two diametrically opposed parts 12, joined together along diametral lines 13 in a manner which will hereinafter be more clearly described as this specification proceeds. The parts 12 include front plates 15 abutting along the diametral lines 13 and having a series of leading cutter bits 16 and trailing rotatable cutter disks 17 spaced about the periphery thereof. The boring head also has a series of circumferentially spaced boring arms 19, 19 extending radially from the periphery thereof and having certain of the leading cutter bits 16 and trailing rollers 17 mounted thereon.

As previously mentioned, the boring head 11 is divided into two halves 12 for ease in transportation and assembly and disassembly of the machine, to facilitate the moving of the machine from one tunnel location to another. The plates 15 of the parts 12 have parallel spaced facing inner walls 21 and 23 extending perpendicular thereto and spaced inwardly of the diametral juncture line 13 of the two plates 15.

The walls 21 and 23 are through drilled in a plurality of places, with adjacent drilled holes substantially in registry with each other. As for example, in through drilling the walls 21 and 23, the positions of the holes are laid out before the boring head is completely fabricated. As shown in FIGURE 2, the holes in the wall 21 are drilled substantially to the diameter of shear collars 24 placed in said holes and are counterbored by a countersink or the like, to provide a welding groove between beveled walls 25 of the holes and the shear collars 24 extending through the holes.

The holes in the wall 23 are drilled oversize as indicated by reference character 27 and are countersunk to provide a beveled wall 29, forming a welding groove for shear collars 30 registerable with the shear collars 24.

Each shear collar 24 has a tapered convex, generally frusto-conical wall 31 adapted to mate with a concave frusto-conical wall 33 of the shear collar 30.

After the holes are drilled in the respective plates 21 and 23, the shear collars 24 are welded to the individual holes in the plate 21, as indicated by reference character 35. The plates 21 and 23, including the halves 12, 12 of the boring head, are then brought together in the position shown in FIGURE 1 and clamped in place, with the drilled holes in the respective plates registering with each other.

Machine screws 36 are then placed through the shear collars 24 and threaded within the shear collars 30 to bring the mating convex and concave surfaces of the respective shear collars into tight engagement with each other.

The shear collars 24 and 30 are then exactly located to assure that the two halves of the boring head are assembled in accurate registry with each other.

With the halves 12, 12 of the boring head clamped together and the shear collars 30 drawn into engagement with the shear collars 24 as shown in FIGURE 2, the shear collars 30 are then welded to the plate 23, as indicated by reference character 37 in the exact relation with respect to the plate 23 to accurately register the halves 12 of the boring head each time the boring head is assembled, regardless of the number of times the boring head is disassembled for transportation purposes.

The same method of securing and aligning the parts of the boring head may also be used to connect the arms 19 to the boring head, where it is necessary to frequently disassemble the machine and it is required that the parts accurately register with each other when assembled.

It may be seen from the foregoing that a simple method and apparatus has been provided for accurately locating the connecting means for two parts of heavy machinery of large size, and particularly the halves of the boring heads of rotary tunneling machines, and assuring accurate alignment of the parts when assembled, regardless of the number of times the parts may be disassembled for transportation purposes, and eliminating the accurate locating and machining for the holes for the connecting means for connecting the parts together, heretofore necessary.

While one form in which the invention may be embodied has herein been shown and described, it should be understood that various variations and modifications in the invention may be attained without departing from the spirit and scope of the novel concepts, as defined by the claims appended hereto.

The invention is claimed as follows:

1. A method of assembling two parts in aligned relation with respect to each other comprising the steps of through drilling the parts through adjacent facing surfaces and drilling the holes in one part to size,
    and the holes in the other part over size, mounting shear collars in the drilled holes drilled to size and welding said shear collars thereto,
    registering the parts in aligned relation with respect to each other,
    placing mating shear collars through the holes drilled oversize and loosely fitting in said holes,
    drawing the shear collars in the holes drilled oversize into mating engagement with the shear collars in the holes drilled to size,
    and then welding the shear collars to the holes drilled oversize and thereby accommodating accurate assembly of the parts regardless of the number of times the parts are assembled and disassembled.

2. A method of assembling two parts having spaced facing surfaces when attached, into registry with each other comprising the steps of locating a plurality of drill holes in the two parts,
    with the drill holes in one part located in aligned relation with the holes in the other part,
    through drilling one part to size through the drill hole locations therein,
    through drilling the other part oversize through the drill hole locations therein,
    mounting shear collars in the drilled holes drilled to size and welding the shear collars thereto,
    clamping said parts together in registry with each other,
    loosely placing shear collars in the holes drilled oversize and registering said shear collars with the shear collars in the holes drilled to size,
    drawing the shear collars in the holes drilled oversize into mating engagement with the shear collars in the holes drilled to size,
    and then welding the shear collars to the part having the holes drilled oversize while the parts are clamped into registry with each other and thereby accommodating accurate assembly of the parts regardless of the number of times the parts are disassembled.

3. A method of assembling two parts having facing surfaces when attached,
    in aligned relation with respect to each other,
    comprising the locating of a plurality of drill holes in said parts,
    with the holes in one part located in aligned relation with the holes in the other part,
    through drilling the parts with the drill holes in one part drilled to size and the drill holes in the other part drilled oversize,
    providing mating shear collars and mounting certain shear collars in the holes drilled to size and welding said shear collars thereto,
    the shear collars for one part having convex engaging faces and the shear collars for the other part having concave engaging faces for receiving said convex engaging faces,
    clamping said parts together in aligned relation with respect to each other,
    placing shear collars in the holes drilled oversize and drawing the shear collars in the holes drilled oversize into mating engagement with the shear collars in the holes drilled to size,
    and then welding the shear collars to the holes drilled oversize and thereby accommodating accurate assembly of the parts regardless of the number of times the parts are torn down and assembled.

References Cited by the Examiner

UNITED STATES PATENTS

| | | | |
|---|---|---|---|
| 1,320,909 | 11/19 | Perlman | 301—21 |
| 1,392,300 | 10/21 | Cole | 29—526 X |
| 1,584,711 | 5/26 | Astrom | 29—526 X |
| 1,756,387 | 4/30 | Ronk | 29—483 X |
| 2,148,855 | 2/39 | Cannon | 74—107 X |
| 2,560,413 | 7/51 | Carlson | 29—464 X |
| 2,889,396 | 6/59 | Boden et al. | 29—464 X |
| 3,048,904 | 8/62 | Kloster | 287—127 X |

FOREIGN PATENTS

| | | |
|---|---|---|
| 122,746 | 2/19 | Great Britain. |
| 205,849 | 1/57 | Australia. |

RICHARD W. COOKE, Jr., *Primary Examiner.*

JACOB L. NACKENOFF, *Examiner.*